(12) United States Patent
Kimura

(10) Patent No.: US 11,143,233 B2
(45) Date of Patent: Oct. 12, 2021

(54) ROLLING BEARING AND METHOD FOR MANUFACTURING ROLLING BEARING

(71) Applicant: JTEKT CORPORATION, Osaka (JP)

(72) Inventor: Kazuhiro Kimura, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 41 days.

(21) Appl. No.: 16/618,986

(22) PCT Filed: Jun. 6, 2018

(86) PCT No.: PCT/JP2018/021658
§ 371 (c)(1),
(2) Date: Dec. 3, 2019

(87) PCT Pub. No.: WO2018/225766
PCT Pub. Date: Dec. 13, 2018

(65) Prior Publication Data
US 2021/0115968 A1 Apr. 22, 2021

(30) Foreign Application Priority Data

Jun. 9, 2017 (JP) .............................. JP2017-114051

(51) Int. Cl.
*F16C 19/18* (2006.01)
*F16C 33/64* (2006.01)
(Continued)

(52) U.S. Cl.
CPC ............ *F16C 19/18* (2013.01); *F16C 19/542* (2013.01); *F16C 33/583* (2013.01); *F16C 33/64* (2013.01);
(Continued)

(58) Field of Classification Search
CPC ...... F16C 19/183; F16C 19/26; F16C 19/583; F16C 33/64; F16C 33/6696;
(Continued)

(56) References Cited

U.S. PATENT DOCUMENTS 6,176,620 B1 *   1/2001   Obara ..................... F16C 21/00
                                              384/127
7,786,637 B2 *   8/2010   Sekimoto ................ F16C 33/32
                                              310/90.5
(Continued)

FOREIGN PATENT DOCUMENTS

CN       102019545 A      4/2011
CN       102425603 A      4/2012
(Continued)

OTHER PUBLICATIONS

Aug. 28, 2018 Search Report issued in International Patent Application No. PCT/JP2018/021658.
(Continued)

*Primary Examiner* — Marcus Charles
(74) *Attorney, Agent, or Firm* — Oliff PLC

(57) ABSTRACT

A rolling bearing includes an inner ring, an outer ring, and a plurality of balls interposed between the inner ring and the outer ring. The inner ring and the outer ring are made of stainless steel. A raceway surface with which the ball is in rolling-contact in each of the inner ring and the outer ring and is a superfinished surface and a coating layer made of a solid lubricating film is formed on the superfinished surface.

6 Claims, 3 Drawing Sheets

(51) Int. Cl.
  *F16C 33/66* (2006.01)
  *F16C 19/54* (2006.01)
  *F16C 33/58* (2006.01)
(52) U.S. Cl.
  CPC ...... *F16C 33/6696* (2013.01); *F16C 2202/54* (2013.01); *F16C 2223/02* (2013.01); *F16C 2223/06* (2013.01); *F16C 2223/30* (2013.01); *Y10S 384/907* (2013.01); *Y10T 29/49679* (2015.01); *Y10T 29/49705* (2015.01)
(58) Field of Classification Search
  CPC .............. F16C 2202/02; F16C 2220/62; F16C 2223/02; F16C 2223/06; F16C 2240/54; F16C 2202/54; F16C 2223/30; F16C 19/542; Y01S 384/907; Y10S 384/912; Y10S 384/907; Y10T 29/49679
  USPC ................ 384/463, 490, 516, 625, 907, 912
  See application file for complete search history.

(56) References Cited

U.S. PATENT DOCUMENTS

| | | | | |
|---|---|---|---|---|
| 8,757,886 B2 * | 6/2014 | Yamamoto | ............. | F16C 33/76 384/484 |
| 2008/0019628 A1 | 1/2008 | Sekimoto et al. | | |
| 2017/0356500 A1 * | 12/2017 | Yamakawa | ......... | F16C 33/6696 |

FOREIGN PATENT DOCUMENTS

| | | | | | |
|---|---|---|---|---|---|
| GB | 2216200 A | * | 10/1989 | ............ | F16C 33/585 |
| JP | H02-154812 A | | 6/1990 | | |
| JP | H02-154813 A | | 6/1990 | | |
| JP | H03-051222 U | | 5/1991 | | |
| JP | H06-229423 A | | 8/1994 | | |
| JP | H06229423 A | * | 8/1994 | .......... | F16C 33/6696 |
| JP | H0874862 A | * | 3/1996 | .......... | F16C 33/6696 |
| JP | 2002-221226 A | | 8/2002 | | |
| JP | 2003232370 A | * | 8/2003 | ............. | F16C 33/64 |
| JP | 2006-153240 A | | 6/2006 | | |
| JP | 2008045573 A | * | 2/2008 | .......... | F16C 33/6696 |
| JP | 2008-169939 A | | 7/2008 | | |
| JP | 2009-024846 A | | 2/2009 | | |
| JP | 2013-056366 A | | 3/2013 | | |
| JP | 2013166205 A | * | 8/2013 | .......... | F16C 33/6696 |
| JP | 2013174339 A | * | 9/2013 | ............. | F16C 33/585 |
| JP | 2017110784 A | * | 6/2017 | ............. | F16C 33/66 |
| JP | 2017115966 A | * | 6/2017 | ............. | F16C 33/32 |
| JP | 2017133685 A | * | 8/2017 | ............. | F16C 19/06 |
| JP | 2017150597 A | * | 8/2017 | ............. | F16C 33/66 |
| WO | WO-2014192503 A1 | * | 12/2014 | .......... | F16C 33/3856 |
| WO | WO-2015041205 A1 | * | 3/2015 | ............. | F16C 33/44 |
| WO | WO-2016011218 A1 | * | 1/2016 | ............... | C21D 1/09 |

OTHER PUBLICATIONS

Dec. 10, 2019 International Preliminary Report on Patentability issued in International Patent Application No. PCT/JP2018/021658.
"Enlarged and Revised Handbook of Lubrication;" edited by Japan Society of Lubrication Engineers; 1982; pp. 343 and 533; 6th Edition.
Feb. 25, 2020 Information Offer issued in Japanese Patent Application No. 2017-114051.
Dec. 31, 2020 Office Action issued in Chinese Patent Application No. 201880037654.8.
Apr. 6, 2021 Office Action issued in Japanese Patent Application No. 2017-114051.

* cited by examiner

ROLLING BEARING AND METHOD FOR MANUFACTURING ROLLING BEARING

TECHNICAL FIELD

An aspect of the present invention relates to a rolling bearing and a method for manufacturing the same.

BACKGROUND ART

Although rolling bearings are used in various equipment, as a rolling bearing in which a coating layer of a solid lubricant film is formed on a bearing ring (inner ring, outer ring), for example, there is a touchdown bearing used for a turbo molecular pump (see Patent Document 1, for example).

The touchdown bearing is provided together with a magnetic bearing, and during the normal rotation of the rotating shaft, the rotating shaft is supported by the magnetic bearing and the touchdown bearing is not in contact with the rotating shaft. On the contrary, for example, when the magnetic bearing becomes uncontrollable, the rotating shaft comes in contact (touch-down) with the bearing ring of the touchdown bearing and is supported until it stops rotating, thereby the magnetic bearing and the rotating shaft is protected.

When the bearing is used under vacuum like a touchdown bearing of a turbo molecular pump, solid lubricant is used because grease or oil cannot be used as lubricant. In addition, since rust preventive oil cannot be used for the bearing ring, stainless steel is often used for the bearing ring.

RELATED ART DOCUMENT(S)

Patent Document(s)

Patent Document 1: JP-A-2009-024846

SUMMARY OF THE INVENTION

Problem to be Solved by the Invention

When coating the surface of the bearing ring with a solid lubricant film, it is desirable to increase its adhesion. However, when the bearing ring is made of stainless steel, phosphate treatment cannot be performed as a pretreatment for coating. Therefore, in the related art, shot blasting is performed as a pretreatment for the bearing ring. In this way, the lubrication of the rolling bearing (touchdown bearing) is ensured by forming a coating layer with a solid lubricant film on the surface of the bearing ring, particularly on a raceway surface with which the rolling elements are in rolling-contact.

Representing the touchdown bearings used for turbo molecular pumps, it is preferable to improve the repetitive lifespan of various rolling bearings. For this reason, research is conducted to improve the adhesion of the coating layer by the solid lubricant film.

An object of an aspect of the invention is to provide a rolling bearing capable of increasing the adhesion of a coating layer by new technical means and further having basic performance of a rolling bearing and a method for manufacturing the same.

Means for Solving the Problem

The inventor of the invention has found that, even when the raceway surface of the bearing ring (inner ring, outer ring) is a superfinished surface, the adhesion of the coating layer by the solid lubricant film can be increased by increasing the surface roughness to some extent (by making a rough mirror surface). Based on this knowledge, the aspects of the invention are completed.

That is, there is provided a rolling bearing according to an aspect of the invention includes: an inner ring; an outer ring; and a plurality of rolling elements interposed between the inner ring and the outer ring, wherein the inner ring and the outer ring are made of stainless steel and a raceway surface with which the rolling element is in rolling-contact is provided in each of the inner ring and the outer ring and is a superfinished surface, and further a coating layer made of a solid lubricating film is formed on the superfinished surface.

According to the rolling bearing, the adhesion of the coating layer is high on the raceway surface, and thus the lifespan of the rolling bearing can be extended. In addition, since the raceway surface is a superfinished surface even when its surface roughness is high to some extent, it is possible to suppress problems such as the occurrence of vibration during rotation and to have basic performance as a rolling bearing.

Unlike the rolling bearing, there is an example in which the raceway surface is a blast surface (satin-finished surface) and a coating layer is formed on the blast surface by a solid lubricant film. However, in a case of the rolling bearing (aspect of the invention), the reason why the coating layer has high adhesion is estimated that the surface condition of a superfinished surface (fine mirror surface) is compatible with the solid lubricating film in the same way as the blast surface or better than the blast surface.

Further, it is preferable that, in the inner ring and the outer ring, a contact surface which is a surface other than the raceway surface and is in contact with another member be a blast surface and a coating layer be formed on the blast surface by a solid lubricant film. According to this configuration, the adhesion of the coating layer is increased even on surfaces other than the raceway surface. Surfaces other than the raceway surface and other than the contact surface are also blast surfaces and a coating layer made of a solid lubricating film may be formed on the blast surfaces.

It is preferable that the coating layer include a molybdenum disulfide film or a tungsten disulfide film. Thereby, the lubrication of rolling bearings can be ensured even under vacuum where grease and oil cannot be used.

It is preferable that a surface roughness Ra of the superfinished surface be 0.1 or more and 0.8 or less. As a result, the raceway surface is a superfinished surface, but since the surface roughness is relatively high, the adhesion of the coating layer is increased. The finishing process for the raceway surface may be a rough superfinishing process. Therefore, for example, the superfinishing process for mirror-surface finishing required on a raceway surface of a rolling bearing used in a machine tool or the like is not required, so the processing cost can be reduced.

As a preferred application, the rolling bearing is a touchdown bearing used for a turbo molecular pump.

According to another aspect of the invention, there is provided a method for manufacturing a rolling bearing which includes an inner ring, an outer ring, and a plurality of rolling elements interposed between the inner ring and the outer ring, the method including: a processing step of obtaining an intermediate product to be the inner ring or the outer ring by turning from an annular stainless steel material and processing the intermediate product; and an assembling step of assembling the inner ring and the outer ring manufactured after finishing the processing step together with the rolling element, wherein the processing includes: a step of performing a polishing processing on a surface of the intermediate product; a step of superfinishing processing on a surface which is provided in the intermediate product after finishing the polishing processing and which is to be a raceway surface with which the rolling element comes into rolling-contact; and a step of forming a coating layer with a solid lubricant film on the superfinished surface.

According to the manufacturing method, when the superfinishing processing is performed on the surface to be the raceway surface, it is possible to increase the adhesion of the coating layer with the solid lubricant film by increasing the surface roughness to some extent. As a result, the lifespan of the rolling bearing can be extended. In addition, since the raceway surface is a superfinished surface, even when its surface roughness is high to some extent, it becomes possible to suppress problems such as the occurrence of vibration during rotation. As a result, the manufactured rolling bearing can have basic performance.

Advantages of the Invention

According to the rolling bearing of an aspect of the invention, the adhesion of the coating layer by the solid lubricating film is high, and thus the lifespan can be extended. According to the manufacturing method of another aspect of the invention, the rolling bearing as described above can be manufactured.

MODE FOR CARRYING OUT THE INVENTION

Figure 1:
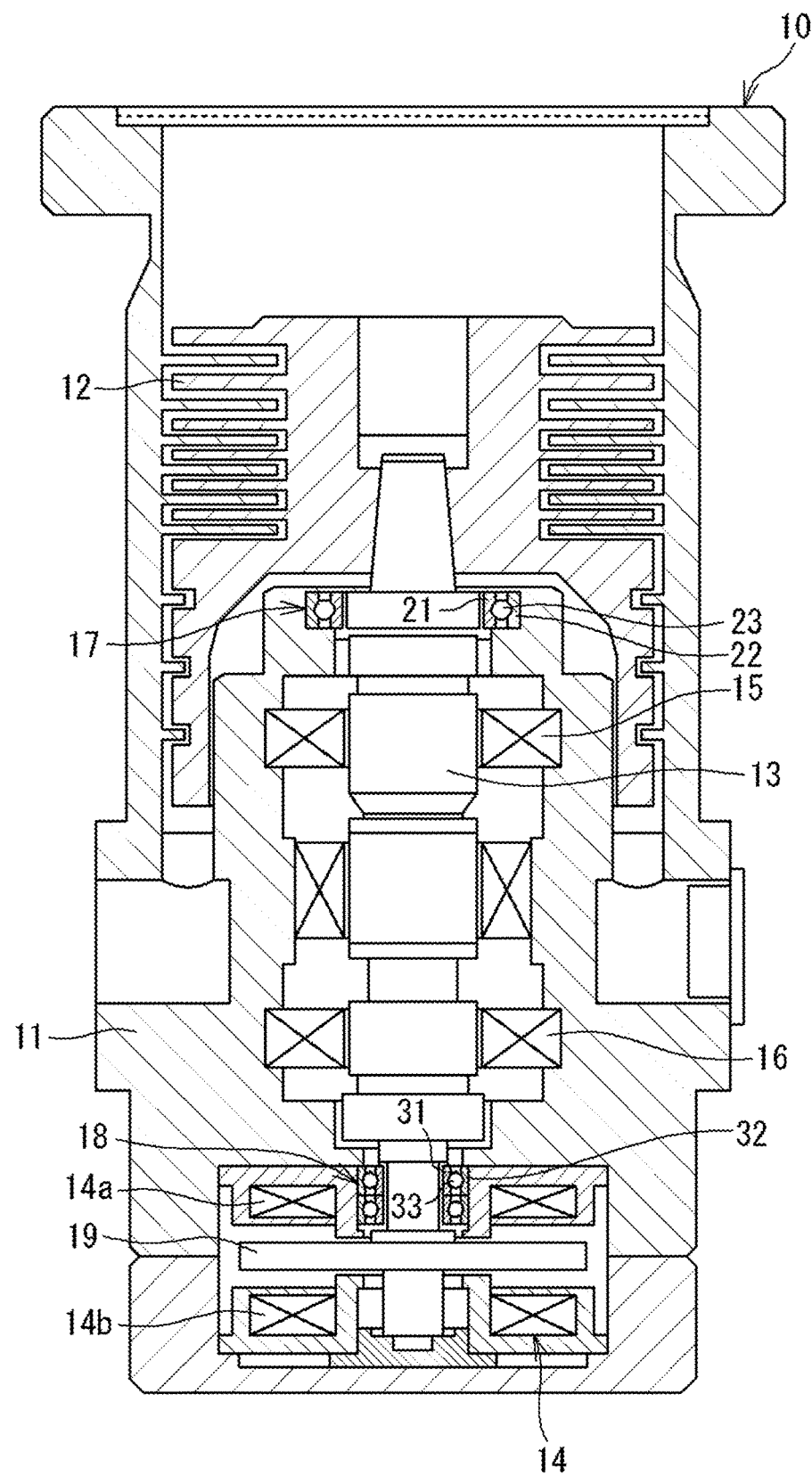
FIG. 1 is a cross-sectional view illustrating an example of a turbo molecular pump provided with a rolling bearing according to an embodiment of the invention.

FIG. 1 is a cross-sectional view illustrating an example of a turbo molecular pump provided with a rolling bearing according to an embodiment of the invention. A turbo molecular pump 10 includes a pump housing 11, a rotor blade 12 provided in the pump housing 11, a rotating shaft (rotor shaft) 13 which rotates integrally with the rotor blade 12, an axial magnetic bearing 14, first and second radial magnetic bearings 15 and 16, a first rolling bearing 17, and a second rolling bearing 18.

Each of the first and second radial magnetic bearings 15 and 16 can support the rotating shaft 13 from a radial direction in a non-contact state. A flange 19 is provided at the end portion (the lower end in FIG. 1) of the rotating shaft 13 and the axial magnetic bearing 14 has a pair of electromagnets 14a and 14b. Those electromagnets 14a and 14b interposes the flange 19 from an axial direction. Thereby, the axial magnetic bearing 14 can support the rotating shaft 13 in the axial direction in a non-contact state with the flange 19 (the rotating shaft 13).

The first rolling bearing 17 is provided on one side (upper side in FIG. 1) of the rotating shaft 13 in the axial direction. The first rolling bearing 17 is a deep groove ball bearing which includes an inner ring 21, an outer ring 22, and a plurality of balls (rolling elements) 23 and can support the radial load of the rotating shaft 13. A gap in the radial direction is provided between the inner ring 21 and the rotating shaft 13 and this gap is smaller than the gap in the radial direction with respect to the rotating shaft 13 of the radial magnetic bearing 15 (16). The outer ring 22 is attached to a part of the pump housing 11.

The second rolling bearing 18 is provided on the other axial side (the lower side in FIG. 1) of the rotating shaft 13. The second rolling bearing 18 is a combined angular ball bearing including an inner ring 31, an outer ring 32, and a plurality of balls (rolling elements) 33 and can support the radial load and the axial load of the rotating shaft 13. A gap in the radial direction is provided between the inner ring 31 and the rotating shaft 13 and this gap is smaller than the gap in the radial direction with respect to the rotating shaft 13 of the radial magnetic bearing 15 (16). The outer ring 32 is attached to a part of the pump housing 11.

According to the configuration described above, the rotating shaft 13 is rotatably supported by the axial magnetic bearing 14 and the radial magnetic bearings 15 and 16 during normal rotation (during normal operation of the turbo molecular pump 10). When those magnetic bearings 14, 15, and 16 become uncontrollable, the rotating shaft 13 comes into contact (touches down) with the inner rings 21 and 31 of the first and second rolling bearings 17 and 18 and the rotating shaft 13 which rotates is supported by the first and second rolling bearings 17 and 18. In this way, the first and second rolling bearings 17 and 18 function as touchdown bearings for the turbo molecular pump 10.

Figure 2:
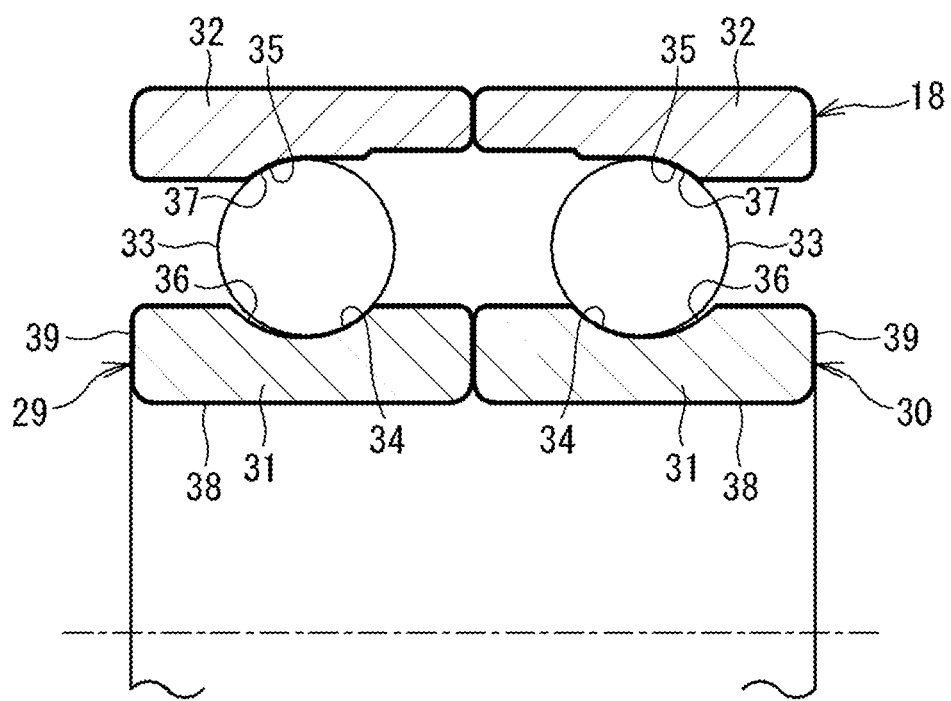
FIG. 2 is a cross-sectional view of the rolling bearing.

FIG. 2 is a cross-sectional view of the second rolling bearing 18. As described above, the second rolling bearing 18 is a combined angular ball bearing and is configured by combining two angular ball bearings 29 and 30. One angular ball bearing 30 and the other angular ball bearing 29 are similar. Hereinafter, one angular ball bearing 30 (hereinafter simply referred to as bearing 30) will be described, but the configuration of the other angular ball bearing 29 is the same. In the first rolling bearing 17 (see FIG. 1), the contact angle of the ball 23 with respect to the inner ring 21 and the outer ring 22 is zero. Accordingly, it differs from the bearing 30 in that the raceway surface of the bearing ring (the inner ring 21 and the outer ring 22) has a deep groove shape, but other than that, it has the same configuration and is manufactured by the same manufacturing method as the bearing 30. For this reason, description of the details of the first rolling bearing 17 will be omitted.

In FIG. 2, the bearing 30 includes the inner ring 31, the outer ring 32, and a plurality of balls 33 (rolling elements) interposed between the inner ring 31 and the outer ring 32 as described above. An inner ring raceway surface 34 is formed on the outer peripheral surface of the inner ring 31 and an outer ring raceway surface 35 is formed on the inner peripheral surface of the outer ring 32. When the bearing 30 (the inner ring 31 in the embodiment) rotates, the balls 33 roll come into rolling-contact with the inner ring raceway surface 34 and the outer ring raceway surface 35.

The inner ring 31 and the outer ring 32 are made of stainless steel (for example, SUS440C). The balls 33 may be made of stainless steel or silicon nitride. The inner ring raceway surface 34 is a superfinished surface and a coating layer 36 made of a solid lubricating film is formed on the superfinished surface. Similarly, the outer ring raceway surface 35 is a superfinished surface and a coating layer 37 made of a solid lubricant film is formed on the superfinished surface. The coating layers 36 and 37 of the embodiment are similar and include a molybdenum disulfide film. A tungsten disulfide film may be used instead of the molybdenum disulfide film.

As described above, the inner ring raceway surface 34 is a superfinished surface. However, the surface roughness is high to some extent and the inner ring raceway surface 34 is a fine mirror surface (micromirror-surface finish surface). Similarly, the outer ring raceway surface 35 is a superfinished surface. However, the surface roughness is high to some extent and the outer ring raceway surface 35 is a fine mirror surface (micromirror-surface finish surface).

A specific example of the surface roughness will be described. The surface roughness (centerline average roughness) Ra of the superfinished surface in each of the inner ring raceway surface 34 and the outer ring raceway surface 35 is preferably set to 0.1 or more and 0.8 or less. More preferably, the upper limit of the surface roughness Ra is 0.6 and the lower limit is 0.2. When the surface roughness Ra is less than the lower limit, the adhesion of the coating layers 36 and 37 by the solid lubricating film may be slightly reduced. Further, when the surface roughness Ra exceeds the upper limit described above, the vibration when the ball 33 is in rolling-contact may be slightly increased.

In the inner ring 31, the surface other than the inner ring raceway surface 34 and in contact with other members is a blast surface and the coating layer 36 made of a solid lubricating film (same as in a case of the inner ring raceway surface 34) is formed on the blast surface. When the bearing 30 functions as a touchdown bearing, an inner peripheral surface 38 and an axial side surface 39 of the inner ring 31 may come into contact (sliding contact) with the rotating shaft 13 (see FIG. 1). Therefore, the inner peripheral surface 38 and the side surface 39 are the above-mentioned "contact surfaces that come into contact with other members" and those inner peripheral surface 38 and side surface 39 are blasted (shot blasted) and coated with a solid lubricant. In the bearing 30 of the embodiment, in the inner ring 31, the surface other than the inner ring raceway surface 34 and other than the contact surfaces (the inner peripheral surface 38 and the side surface 39) is also a blast surface and the coating layer 36 made of a solid lubricating film is formed on the blast surface. That is, the coating layer 36 is formed on the entire surface of the inner ring 31. However, the pretreatment for coating the solid lubricant film is different between the inner ring raceway surface 34 and other surfaces, and thus the inner ring raceway surface 34 is superfinished while the other surface is blasted.

Also, in the outer ring 32, the surface other than the outer ring raceway surface 35 is a blast surface and the coating layer 37 made of a solid lubricating film (same as a case of the outer ring raceway surface 35) is formed on the blast surface. That is, the coating layer 37 is formed on the entire surface of the outer ring 32. However, the pretreatment for coating the solid lubricant film is different between the outer ring raceway surface 35 and other surfaces, and thus the outer ring raceway surface 35 is superfinished while the other surface is blasted.

Figure 3:
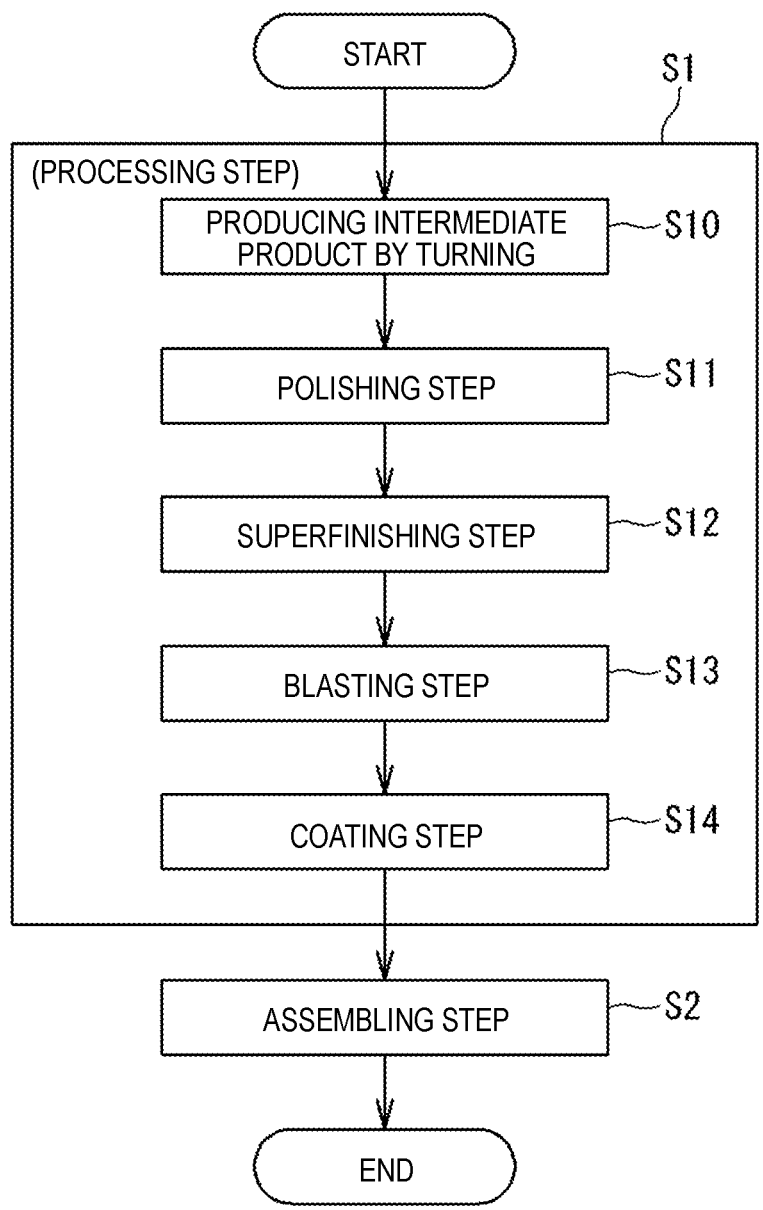
FIG. 3 is a flowchart illustrating a method for manufacturing the rolling bearing.

The method for manufacturing the bearing 30 will be described. FIG. 3 is a flowchart illustrating the manufacturing method. This manufacturing method includes a processing step S1 and an assembling step S2. In the processing step S1, an intermediate product that becomes the inner ring 31 or the outer ring 32 is obtained by turning from an annular stainless steel material and each intermediate product is processed. In the assembling step S2, the inner ring 31 and the outer ring 32 manufactured after finishing the processing step S1 are assembled together with the balls 33.

The processing step S1 includes a polishing step S11, a superfinishing step S12, and a coating step S14, in addition to a step S10 for producing the intermediate product by turning. Further, the processing step S1 of the embodiment includes a blasting step S13.

In the step S10 of manufacturing the intermediate product to be the inner ring 31 or the outer ring 32 by turning, the outer peripheral surface, inner peripheral surface, and both axial end surfaces of the annular stainless steel material are turned into a predetermined shape and grooves are formed by turning in the inner ring raceway surface 34 (see FIG. 2) or the outer ring raceway surface 35.

In the polishing step S11, the surface of the intermediate product is polished. In the embodiment, polishing is performed on the entire surface of the intermediate product.

In the superfinishing process S12, in the intermediate product (inner ring intermediate product) that becomes the inner ring 31 after finishing the polishing process, superfinishing is performed on the surface that becomes the inner ring raceway surface 34 and superfinishing is performed on the surface that becomes the outer ring raceway surface 35 in the intermediate product (outer ring intermediate product) that becomes the outer ring 32. The superfinishing process performed on each of the inner ring raceway surface 34 and the outer ring raceway surface 35 is not a mirror finish but a micro-mirror finish, and the surface roughness of the finished surface is processed to be high to a certain extent. For example, the surface roughness Ra of the superfinished surface (the inner ring raceway surface 34 and the outer ring raceway surface 35) is 0.1 or more and 0.8 or less. Surfaces other than the inner ring raceway surface 34 in the inner ring intermediate product and surfaces other than the outer ring raceway surface 35 in the outer ring intermediate product are not superfinished and remain polished surfaces by polishing (polishing step S11).

The superfinishing process S12 is intended only for the inner ring raceway surface 34 and the outer ring raceway surface 35. When those raceway surfaces are superfinished surfaces, the inner ring raceway surface 34 and the outer ring raceway surface 35 are each masked to ensure a fine mountain valley shape on the superfinished surface (fine mirror surface). In addition, blasting (blasting step S13) is performed for each of the inner ring intermediate product and the outer ring intermediate product. As a result, fine irregularities are formed on the surfaces other than the inner ring raceway surface 34 and the outer ring raceway surface 35.

As described above, in the blasting step S13 of the embodiment, the blasting process is performed on all surfaces except the inner ring raceway surface 34 in the surface of the inner ring intermediate product that has been polished and blasting is performed on all the surfaces except the outer ring raceway surface 35 in the surface of the outer ring intermediate product that has been polished. The surface roughness Ra of the blasted surface is, for example, 0.1 or more and 1.0 or less.

In the coating step S14, a coating layer made of a solid lubricating film is formed on the superfinished surface (which becomes the inner ring raceway surface 34 or the outer ring raceway surface 35). Further, in the coating step S14 of the embodiment, a coating layer made of a solid lubricating film is also formed on the surface subjected to the blasting process in the blasting step 13. In other words, in the inner ring intermediate product, coating is performed on the surface (blast surface) other than the inner ring race way surface 34 in accordance with the coating on the inner ring raceway surface 34. Then, in the outer ring intermediate product, coating is performed on the surface (blast surface) other than the outer ring race way surface 35 in accordance with the coating on the outer ring raceway surface 35. In this embodiment, coating with molybdenum disulfide is performed and the specific direction is according to the method performed in the related art.

When the coating step S14 is completed, the assembling step S2 is performed. In the assembling step S2, the ball 33 is interposed between the inner ring 31 and the outer ring 32 by the method of the related art. As a result, the bearing 30 is completed.

The bearing 30 (see FIG. 2) manufactured as described above is a rolling bearing in which the inner ring 31 and the outer ring 32 are made of stainless steel and the inner ring raceway surface 34 and the outer ring raceway surface 35 with which the balls 33 are in rolling-contact are superfinished surfaces, and further, the coating layers 36 and 37 made of a solid lubricating film are formed on the superfinished surface.

According to the bearing 30, even when each of the inner ring raceway surface 34 and the outer ring raceway surface 35 is a superfinished surface, the surface roughness is high to some extent (is made a fine mirror surface), and thus the adhesion of the coating layers 36 and 37 by the solid lubricant film is increased. That is, the superfinished surface of the embodiment does not need to be a mirror-finished surface and may be a fine mirror surface, which increases the adhesion of the coating layers 36 and 37. As a result, the repetitive performance (lifetime) as the touch-down bearing of the turbo molecular pump 10 can be extended and the overhaul cycle of the turbo molecular pump 10 can be extended.

In the bearing 30 of the embodiment, the inner ring raceway surface 34 and the outer ring raceway surface 35 are superfinished surfaces (fine mirror surfaces) even when the surface roughness is high to some extent. Therefore, it is possible to suppress problems such as the occurrence of vibration during rotation, and thus it is possible to have basic performance as a rolling bearing. In the bearing 30 of the embodiment, the reason why the adhesion of the coating layers 36 and 37 is high is estimated that the surface state of the inner ring raceway surface 34 and the outer ring raceway surface 35, which are superfinished surfaces (micro mirror surfaces), is compatible with the solid lubricating film in the same manner as the blast surface or better than the blast surface.

In the embodiment, blasting is performed on the surfaces of the inner ring intermediate product and the outer ring intermediate product after finishing the polishing process, except for the raceway surfaces (34, 35), and the coating layer (36, 37) made of a solid lubricant film is formed on the blasted surface. For this reason, it is possible to increase the adhesion of the coating layer (36, 37) on surfaces other than the raceway surfaces (34, 35).

Further, the finishing process for each of the inner ring raceway surface 34 and the outer ring raceway surface 35 may be a rough superfinishing process. Therefore, for example, the superfinishing process for mirror finishing required on the raceway surface of the rolling bearing used in a machine tool or the like is not required, and thus the processing cost can be reduced. In order to achieve a rough superfinish, a polishing material such as a grindstone having a coarser grain than that in a case of a mirror finish may be used.

Since the inner ring 31 and the outer ring 32 are made of stainless steel, rust preventive oil is not necessary. Further, since the coating layers 36 and 37 are made of a molybdenum disulfide film, the lubricity of the bearing 30 can be ensured even in a vacuum where grease or oil cannot be used. That is, the bearing 30 of the embodiment is suitable as a touchdown bearing for the turbo molecular pump 10.

The embodiment disclosed above is illustrative in all respects and not restrictive. That is, the rolling bearing of the invention is not limited to the illustrated form, but may be of another form within the scope of the invention. The bearing 30 of the embodiment described above is a touchdown bearing used for the turbo molecular pump 10 (see FIG. 1), but can be used for other applications. Further, although the embodiment described above demonstrates a case where the rolling element is a ball, the rolling element may be a roller and the rolling bearing may be a roller bearing.

This application is based on a Japanese patent application (Japanese Patent Application No. 2017-114051) filed on Jun. 9, 2017, the contents of which are incorporated herein by reference.

DESCRIPTION OF REFERENCE SIGNS

10: turbo molecular pump
31: inner ring
32: outer ring
33: ball (rolling element)
34: inner ring raceway surface
35: outer ring raceway surface
36: coating layer
37: coating layer
38: inner peripheral surface
39: side surface

The invention claimed is:

1. A touchdown bearing, comprising:
an inner ring;
an outer ring; and
a plurality of rolling elements interposed between the inner ring and the outer ring,
wherein the inner ring and the outer ring are made of stainless steel,
wherein a raceway surface with which the rolling element is in rolling-contact is provided in each of the inner ring and the outer ring and is a superfinished surface having a surface roughness Ra of 0.1 or more and 0.8 or less, and a coating layer made of a solid lubricating film is formed on the superfinished surface, and
wherein a contact surface which is a surface other than the raceway surface and is in contact with another member is a blast surface having a surface roughness Ra of 0.1 or more and 1.0 or less, and a coating layer is formed on the blast surface by a solid lubricant film.

2. The touchdown bearing according to claim 1, wherein the coating layer comprises a molybdenum disulfide film or a tungsten disulfide film.

3. The touchdown bearing according to claim 1, wherein the rolling elements are made of stainless steel or silicon nitride.

4. The touchdown bearing according to claim 3, wherein the inner ring and the outer ring are not subject to a phosphate treatment as a pretreatment before formation of the coating layer made of the solid lubricating film on the superfinished surface.

5. The touchdown bearing according to claim 4, wherein the rolling elements are made of stainless steel.

6. A method for manufacturing a touchdown bearing which comprises an inner ring, an outer ring, and a plurality of rolling elements interposed between the inner ring and the outer ring, the method comprising:

obtaining an intermediate product to be the inner ring or the outer ring by turning from an annular stainless steel material and processing the intermediate product; and assembling the inner ring and the outer ring manufactured by processing the intermediate product together with the rolling element, wherein said processing the intermediate product comprises:

polishing a surface of the intermediate product;

superfinishing a surface which is provided in the polished intermediate product and which is to be a raceway surface with which the rolling element comes into rolling-contact such that a superfinished surface has a surface roughness Ra of 0.1 or more and 0.8 or less;

performing blasting for the intermediate product with the raceway surface masked such that a blast surface has a surface roughness Ra of 0.1 or more and 1.0 or less; and forming a coating layer with a solid lubricant film on the superfinished surface.

* * * * *